United States Patent
Chow et al.

(10) Patent No.: US 9,198,080 B2
(45) Date of Patent: *Nov. 24, 2015

(54) BROADBAND TELECOMMUNICATION SERVICE FOR PROVIDING A PERSONALIZED SERVICE CAPABILITY TO A MOBILE TERMINAL AT A REMOTE ENVIRONMENT

(75) Inventors: Albert Chow, Hillsdale, NJ (US); Kenny Xiaojian Huang, Brooklyn, NY (US); Jinman Kim, Florham Park, NJ (US); Wenchu Ying, Cedar Knolls, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 977 days.

This patent is subject to a terminal disclaimer.

(21) Appl. No.: 12/391,127

(22) Filed: Feb. 23, 2009
(Under 37 CFR 1.47)

(65) Prior Publication Data
US 2009/0161631 A1    Jun. 25, 2009

Related U.S. Application Data

(63) Continuation of application No. 10/163,501, filed on Jun. 7, 2002, now Pat. No. 7,496,102.

(51) Int. Cl.
| | |
|---|---|
| H04W 4/00 | (2009.01) |
| H04W 28/06 | (2009.01) |
| H04L 29/06 | (2006.01) |
| H04L 29/08 | (2006.01) |
| H04W 60/00 | (2009.01) |

(52) U.S. Cl.
CPC ............... *H04W 28/06* (2013.01); *H04L 29/06* (2013.01); *H04L 67/14* (2013.01); *H04L 67/303* (2013.01); *H04L 69/24* (2013.01); *H04L 69/329* (2013.01); *H04W 4/00* (2013.01); *H04W 60/00* (2013.01)

(58) Field of Classification Search
CPC ..................................................... H04W 36/14
USPC .......... 370/331, 332, 333, 334; 455/436, 439, 455/442, 33.2
See application file for complete search history.

(56) References Cited

U.S. PATENT DOCUMENTS

| | | | |
|---|---|---|---|
| 6,119,001 A * | 9/2000 | Delis et al. ..................... 455/433 |
| 6,249,814 B1 | 6/2001 | Shaffer et al. |
| 6,253,081 B1 | 6/2001 | Koster |
| 6,308,203 B1 | 10/2001 | Itabashi et al. |
| 6,353,737 B1 * | 3/2002 | Herzog .......................... 455/418 |
| 6,584,312 B1 | 6/2003 | Morin et al. |
| 6,671,510 B1 * | 12/2003 | Kelly et al. ..................... 455/445 |
| 6,704,396 B2 | 3/2004 | Parolkar et al. |
| 6,742,036 B1 | 5/2004 | Das et al. |

(Continued)

OTHER PUBLICATIONS

Mohammed Zaid, "Personal Mobility in PCS," 1994, IEEE, Personal Communications, pp. 12-16.

*Primary Examiner* — Hassan Kizou
*Assistant Examiner* — Abdelnabi Musa

(57) ABSTRACT

Embodiments of a system and method of providing broadband telecommunication services over a packet-switched network enable enhanced personalization. A mobile terminal is registered in a first remote environment, where the mobile terminal has a home environment and a home service capability. The telecommunication services are provided to the mobile terminal in the first remote environment in accordance with the home service capability.

19 Claims, 7 Drawing Sheets

(56) References Cited

U.S. PATENT DOCUMENTS

| | | | |
|---|---|---|---|
| 6,785,256 B2 | 8/2004 | O'Neill | |
| 6,804,533 B1 | 10/2004 | Makinen | |
| 6,968,193 B2 | 11/2005 | Van Loon et al. | |
| 6,973,057 B1 * | 12/2005 | Forslow | 370/328 |
| 7,016,677 B2 | 3/2006 | Fukasawa et al. | |
| 7,058,413 B2 | 6/2006 | Lin et al. | |
| 7,062,265 B1 | 6/2006 | Chang et al. | |
| 7,096,015 B2 | 8/2006 | Bridges et al. | |
| 7,184,415 B2 * | 2/2007 | Chaney et al. | 370/260 |
| 7,222,192 B2 | 5/2007 | Allison et al. | |
| 7,274,683 B2 | 9/2007 | Segal | |
| 7,496,102 B2 | 2/2009 | Chow et al. | |
| 7,882,207 B1 * | 2/2011 | Titmuss et al. | 709/223 |
| 2001/0031635 A1 * | 10/2001 | Bharatia | 455/432 |
| 2002/0101880 A1 | 8/2002 | Kim | |
| 2002/0102973 A1 | 8/2002 | Rosenberg | |
| 2002/0147828 A1 * | 10/2002 | Chen et al. | 709/231 |
| 2002/0154755 A1 | 10/2002 | Gourraud | |
| 2002/0173307 A1 | 11/2002 | Salmivalli et al. | |
| 2003/0054809 A1 | 3/2003 | Bridges et al. | |
| 2003/0157942 A1 | 8/2003 | Osmo | |
| 2003/0185203 A1 * | 10/2003 | Chow et al. | 370/352 |
| 2004/0003058 A1 | 1/2004 | Trossen | |

\* cited by examiner

BROADBAND TELECOMMUNICATION SERVICE FOR PROVIDING A PERSONALIZED SERVICE CAPABILITY TO A MOBILE TERMINAL AT A REMOTE ENVIRONMENT

CROSS REFERENCE TO RELATED APPLICATIONS

This application is a continuation of U.S. patent application Ser. No. 10/163,501, filed Jun. 7, 2002, now U.S. Pat. No. 7,696,102 B2, which is herein incorporated by reference in its entirety.

The present invention is related to the U.S. patent application Ser. No. 10/163,500, filed on Jun. 7, 2002 of Albert Chow et al., entitled "Providing Mobility in a Distributed End-to-End Packet/Cell/Frame Network."

TECHNICAL FIELD

Embodiments of the present invention generally relate to broadband telecommunication services. More particularly, embodiments relate to methods and systems of providing broadband telecommunications services over packet switched networks that enable mobile terminals to maintain personalized service.

DISCUSSION

Telecommunications services are critical to a wide variety of industries and daily activities, and have long been integral to the functioning of society. For example it is well documented that voice, data and multimedia applications have all proven to be useful in one circumstance or another. Indeed, there is a rapidly increasing demand to integrate these various types of applications into a seamless fabric of telecommunication services. While the trend toward integrated telecommunication services is quite desirable to the consumer, a number of challenges remain.

From a telecommunication standpoint, the integration of the above and other applications has been facilitated by the evolution from traditional analog networks to broadband networks. Broadband networks use digital technology to make more efficient use of the transmission capacity of the physical architecture being used. For example, broadband architectures based on cable, hybrid fiber coaxial cable (HFC) and the digital subscriber line family of technologies (xDSL) have enabled leased line transmission rates in excess of 1.544 Mbs (i.e., T1+). Thus, higher transmission rates have provided an opportunity to increase the number and quality of telecommunication services available to the end user. It should be noted, however, that conventional approaches to managing these services need to be improved. For example, the service criteria associated with integrated telecommunication applications enabled by broadband networks can be too complicated for traditional circuit switch approaches to establishing links. Establishing telecommunication links is particularly important when dealing with mobile terminals such as laptop, personal digital assistants (PDA's), cellular phones, etc. Unfortunately, circuit switch-facilitated dial tone and numbering schemes such as directory number (DN), E.164 cannot support the sophisticated user-to-network interaction required to fulfill and communicate all of the service criteria. For example, criteria such as service and feature selections, maintenance of personal address books and directories, profiles and databases, and service preferences are all aspects of an integrated broadband service that might be customized or identified when a mobile terminal establishes a link. Thus, the simplicity of the traditional telephone keypad cannot fulfill these needs.

There is, therefore, a need to make use of multi-module user-interfaces such as speech/voice recognition to enable the consumer to interact with the network in a more human/natural, and sophisticated manner. In particular, in dealing with a mobile terminal, conventional approaches are significantly limited with regard to service capability. For example, if a mobile terminal is registered in a remote environment under conventional approaches, the telecommunications service must be provided to the mobile terminal in accordance with the service capability of the remote environment. As a result, a subscriber having a terminal with an associated home service capability (such as enhanced video capability) might be forced to communicate in accordance with an entry-level service such as 64K bps video. There is therefore a need to provide a mobile terminal with personalized telecommunications service capability.

SUMMARY OF THE INVENTION

Exemplary embodiments of the present invention provide a system and method of providing a broadband telecommunication service over a packet-switched network. The method and system provide for registering a mobile terminal in a first remote environment, where the mobile terminal has a home environment and a home service capability. The telecommunication service is provided to the mobile terminal in the first remote environment in accordance with the home service capability. By enabling the mobile terminal to receive service in accordance with the home service capability, as opposed to the remote environment service capability, an improved level of personalization can be achieved.

In other exemplary embodiments, a system and method of registering a mobile terminal in a remote environment involves receiving a registration message from an access agent of the remote environment. The method and system provide for verifying that the registration message was initiated by the mobile terminal. Profile information associated with the mobile terminal is sent to the access agent, where the profile information includes a home service capability. Further in accordance with exemplary embodiments, a computer readable storage medium storing a set of instructions capable of being executed by a processor implements the various principles described herein.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute part of this specification. The drawings illustrate various features and embodiments of the invention, and together with the description serve to explain the principles and operation of the invention.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
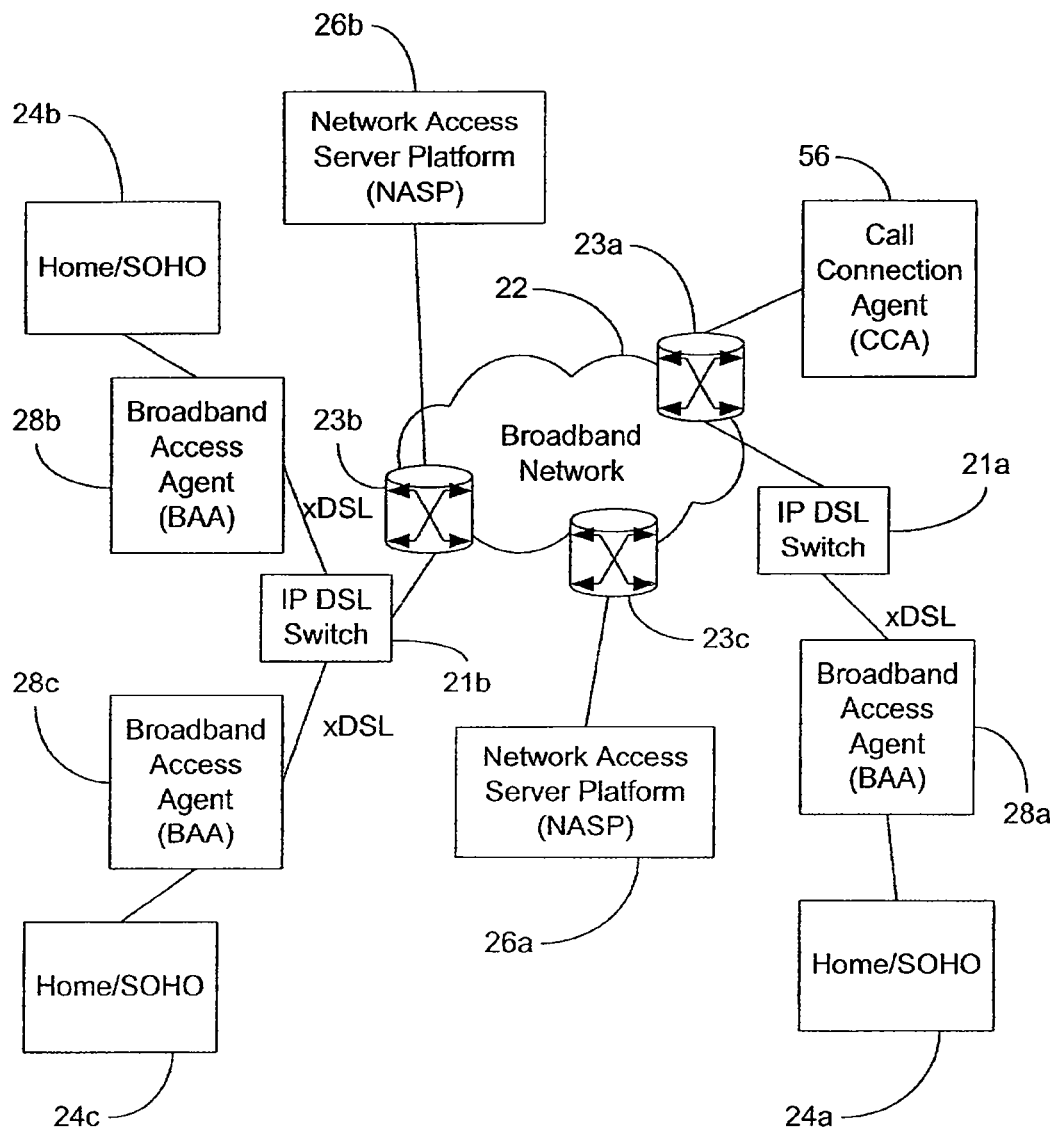
FIG. 1 is a diagram of an example of a networking architecture in accordance with one embodiment of the present invention.

Turning now to FIG. 1, a networking architecture 20 is shown. The architecture 20 utilizes a broadband network 22 to deliver telecommunication services to one or more small office/home office (SOHO) environments 24. While some embodiments will be discussed with regard to video conferencing, it should be noted that the embodiments of the invention are not so limited. In fact, the telecommunication services may be either network centric or provide specific, and can include but are not limited to voice applications, data applications, video applications, multimedia applications or any combination thereof. Notwithstanding, there are a number of aspects of video conferencing for which the systems and methods discussed herein are uniquely suited.

Generally, the architecture 20 includes one or more broadband access agents (BAA's) 28, one or more network access service platforms (NASP's) 26, one or more Internet protocol (IP) digital subscriber line (DSL) switches 21, and one or more routing devices 23. As will be discussed in greater detail below, an NASP is a network centric service element that provides interworking functions between one or more network access entities located in environments 24, a content services provider (not shown) and the broadband network 22 to facilitate services and applications. Thus, each NASP has the capability of providing subscribers with the ability to access the services.

It will be appreciated that the interaction procedures that locate and deliver services, as well as the methodologies that allow the introduction of advanced services in a distributed intelligent manner are given a particular focus on mobility management. Specifically, subscribers can customize their telecommunication needs, such as service and feature selections, maintenance of personal address books and directories, profiles and databases and service preferences by programming the NASP 26 at their convenience. The NASP assists the subscriber in accessing the telecommunication services via the broadband network 22 and replaces the traditional dial tone and telephone key pad with technologies such as speech coding, interactive voice, voice recognition, and text-to-speech processing. When the user wishes to request a telecommunication service, the user merely picks up a phone, turns on a laptop/personal computer (PC) or initiates the NASP application. As a result, the user can interact with the NASP instantaneously/directly via one of the premise-based BAA's 28 to fulfill, initiate and terminate the service requests in a multi-session and multi-application. The NASP, on behalf of the user, interacts with the broadband network 22 and the BAA to deliver a network centric or provider specific service to the mobile terminal. Each user can program, via a web-based service management dialog or through an interactive voice session supported by the NASP/BAA, and the NASP provides personalized services to the user on-demand. The NASP also obliterates the necessity of consumers programming each of their communication devices with their preferences (unless they so desire).

An important aspect of the architecture 20 is the ability of the mobile terminal to receive services any time, anywhere and by any mechanism (i.e., not just when the subscriber is at home). In other words, mobility management enhances the overall services to the subscriber and is important for widespread acceptance and usage. Generally, mobility management is accomplished when the mobile terminal registers with a visiting BAA (or access agent) and the subscriber's home NASP. The access agent forwards the registration message to the subscriber's home NASP. The home NASP updates the subscriber's location (i.e., based on the assigned IP address), and routes all services including incoming calls to the subscriber in the remote environment. Additionally, since the access agent knows the capabilities of the mobile terminal, it can allocate additional resources to support the terminal. As a result, the subscriber can access all services as if the subscriber were in the home environment.

Figure 2:
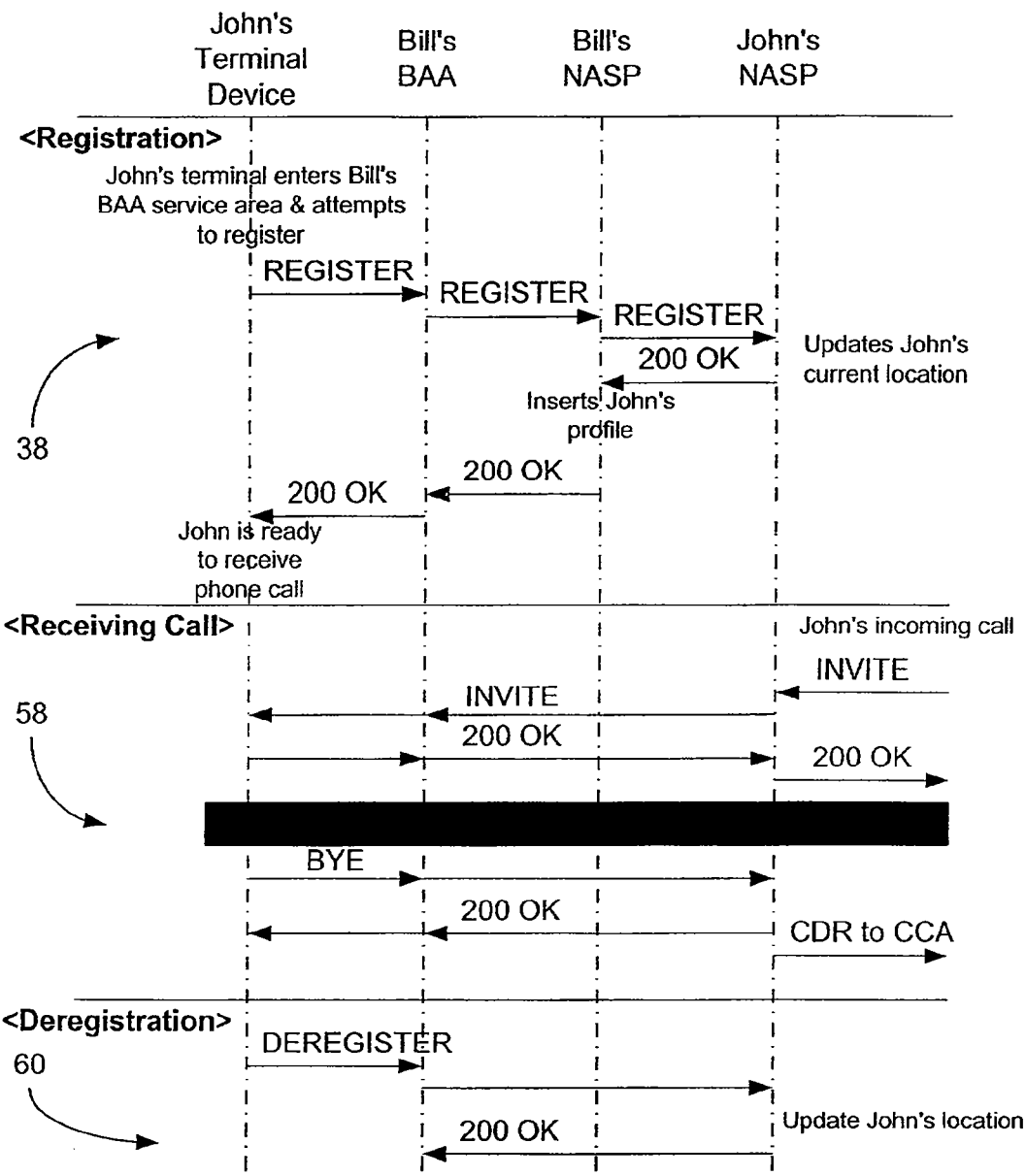
FIG. 2 is a timing diagram of an example of a call flow in accordance with one embodiment of the present invention.
Figure 5:
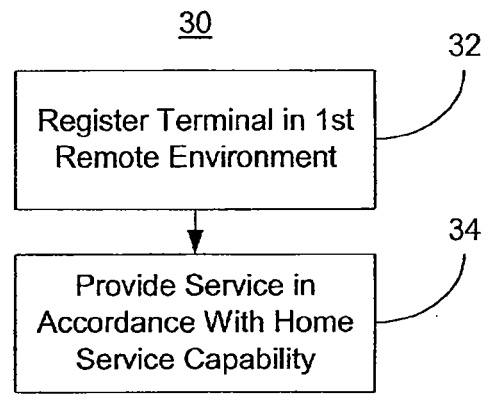
FIG. 5 is a flowchart of an example of a computer implemented method of providing a broadband telecommunication service in accordance with one embodiment of the present invention.

FIG. 5 shows a method 30 that can be used to implement an NASP 26 (FIG. 1). Specifically, it can be seen that the computer implemented method 30 of providing a broadband telecommunication service over a packet-switched network involves registering a mobile terminal in a first remote environment at processing block 32. It will be appreciated that the mobile terminal has a home environment and a home service capability. Processing block 34 illustrates that the telecommunication service is provided to the mobile terminal in the first remote environment in accordance with the home service capability. Thus, the subscriber is able to receive the personalized service to which he or she is accustomed. FIG. 2 illustrates a specific mobility management scenario at timing diagram 36 to demonstrate the benefits associated with the principles described herein in greater detail.

With continuing reference to FIGS. 1 and 2, suppose a subscriber "John" has a mobile terminal with video capabilities. John's mobile terminal has a home environment 24a and an associated home service capability. He is expecting an important business video call from overseas during a time period in which he is visiting his friend "Bill". Bill lives in first remote environment 24b. When John is in Bill's house, John's terminal is registered with Bill's BAA 28b. Bill's default video service happens to be an entry-level service, such as 64 Kbps. In such case, with the assistance of Bill's NASP 26b and John's NASP 26a, Bill's BAA 28b upgrades with additional capability or simply "turns on" additional video services to support the higher bandwidth video service as subscribed to by John. John's terminal provides information necessary for Bill's BAA 28b to contact John's NASP 26a. After an authentication process, John's NASP 26a acknowledges John's current whereabouts and authorizes the transfer of calls and other services to John in Bill's environment 24b. Thus, the registration process 38 provides a unique approach to personalization of telecommunication services.

Figure 6:
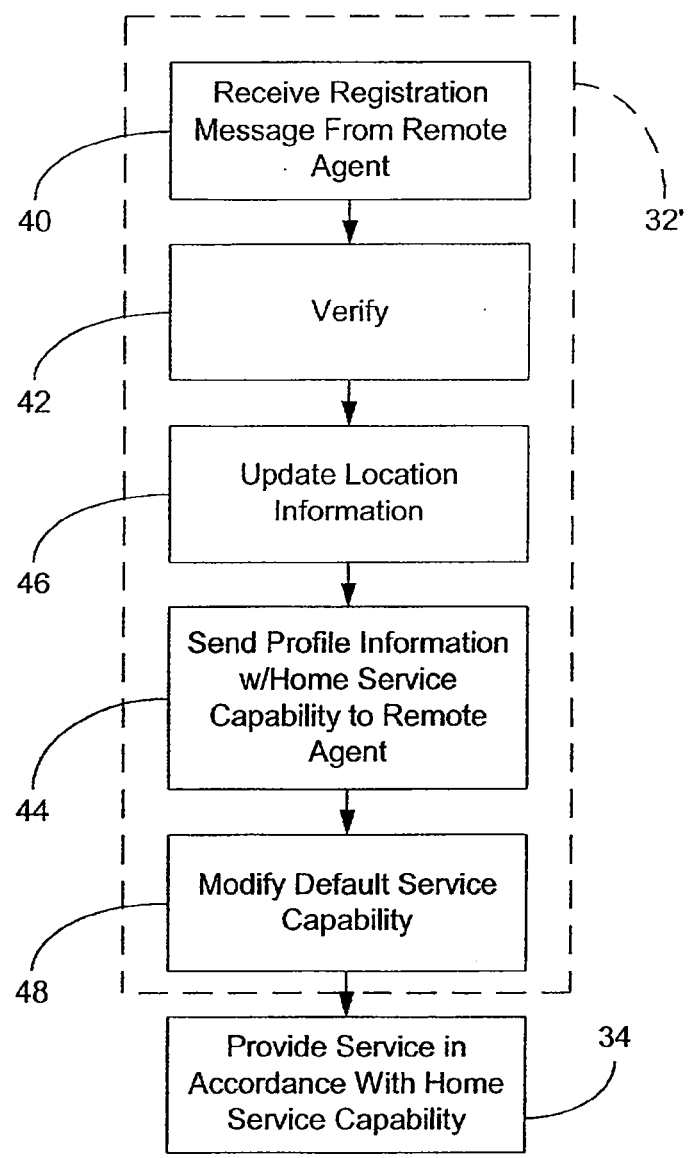
FIG. 6 is a flowchart of an example of an approach to registering a terminal in a first remote environment in accordance with one embodiment of the present invention.

Turning now to FIG. 6, one approach to registering the mobile terminal in the first remote environment is shown in greater detail at processing block 32'. Specifically, it can be seen that a registration message is received from an access agent of the first remote environment (BAA 28b in the above example) at block 40. Processing block 42 provides for verifying that the registration message was initiated by the mobile terminal. Profile information associated with the mobile terminal is sent to the access agent at block 44, where the profile information includes the home service capability. It is important to note that the profile information may include other data such as service and future selections, address book and directory information, profiles and databases and service preferences. It can also be seen that in the illustrated embodiment, location information associated with the mobile terminal is updated at block 46 based on the registration message. One approach to updating the location information would be to store an IP address associated with the first remote environment to a computer readable medium such as an appropriate random access memory (RAM), read only memory (ROM), electrically erasable programmable read only memory (EEPROM) or any other medium. It can further be seen that where the first remote environment has a default service capability, block 48 provides for modifying such a capability based on the home service capability.

Figure 7:
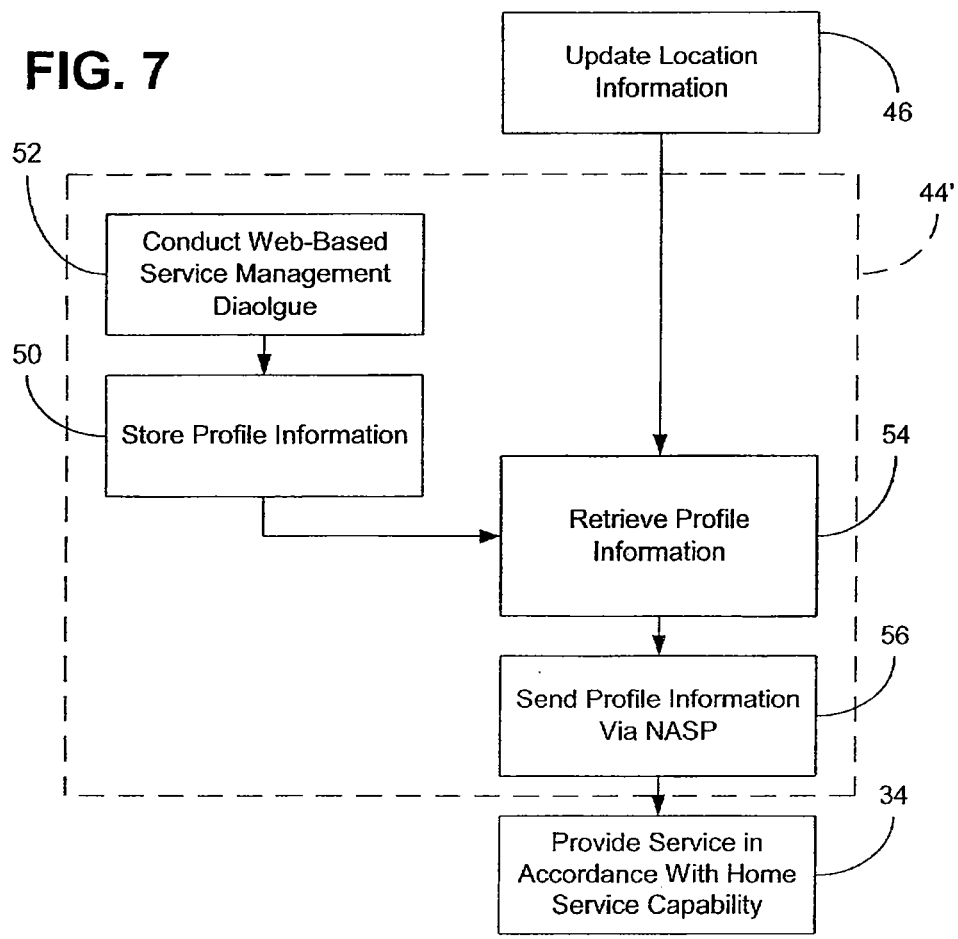
FIG. 7 is a flowchart of an example of an approach to sending profile information to an access agent in accordance with one embodiment of the present invention.

Turning now to FIG. 7, one approach to sending profile information is shown in greater detail at processing block 44'. It can generally be seen that a portion of the process may be conducted "offline" with regard to the registration process. Specifically, the process information is stored at block 50 in accordance with either a web-based service management dialog or an interactive voice session. The illustrated embodiment uses the example of a web-based service dialog at block 52, but the interactive voice session, using commercially available speech synthesis/recognition techniques may also be conducted. In any event, the profile information is retrieved at block 54 and may be sent to the access agent via the remote NASP at block 56.

Returning now to FIGS. 1 and 2, the scenario depicted in timing diagram 36 will be continued. When John's NASP 26a receives the call, John's NASP 26a routes the call to Bill's BAA 26b, where John is currently located. Once John completes the call, John's NASP 26a can generate a call detailed record (CDR) and send the CDR to a call-connection agent (CCA) 56. The CDR enables John to use Bill's BAA 28b with enhanced functionalities as if John were at home and all the services originated/received by John are charged to his account located at his NASP 26a. Thus, the call receiving process 58 provides a unique approach to the delivery of telecommunication services.

It can be seen that after John finishes with his call and deregisters from Bill's BAA 28b, Bill's BAA 28b informs John's NASP 26b that John will no longer be reachable in the first remote environment 24b. As illustrated in the deregistration process 60, John's NASP 26a updates John's current location information by using the contact information programmed/customized by John from the profile database for all future contacts and services.

Figure 9:
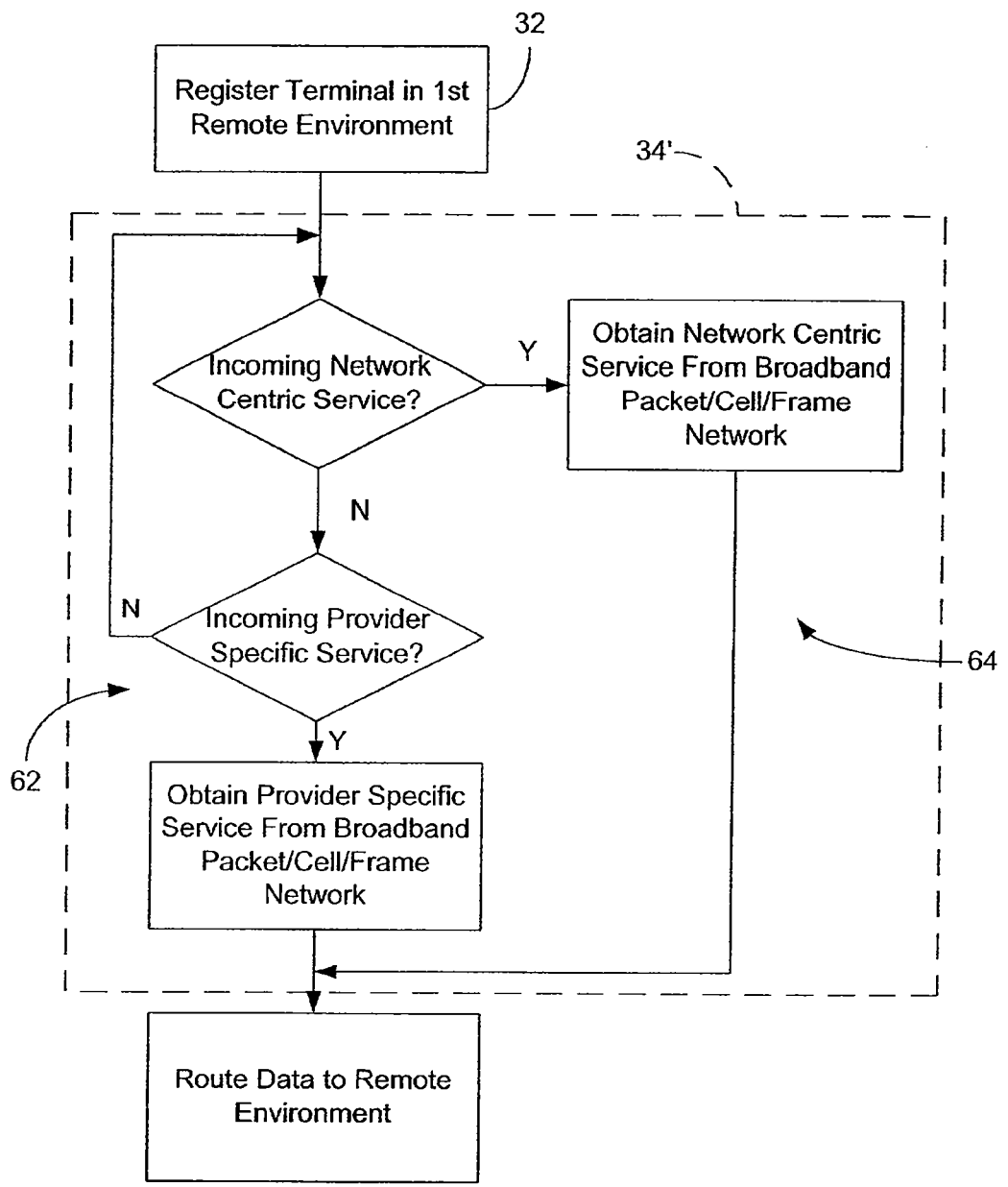
FIG. 9 is a flowchart of an example of an approach to providing a telecommunication service to a mobile terminal in accordance with one embodiment of the present invention.

FIG. 9 illustrates one approach to providing service in accordance with the home service capability in greater detail at processing block 34'. It will be appreciated that depending upon the circumstances, either a provider specific service can be provided at blocks 62 or a network centric service, may be provided at blocks 64. In network centric services, the NASP intelligence resides out on the network, whereas the NASP intelligence of a provider specific service typically resides in a provider "black box". It should also be noted that a wide variety of well documented broadband applications such as video conferencing, multimedia and online shopping can be provided to the mobile terminal.

Terminal Handoff

Figure 3:
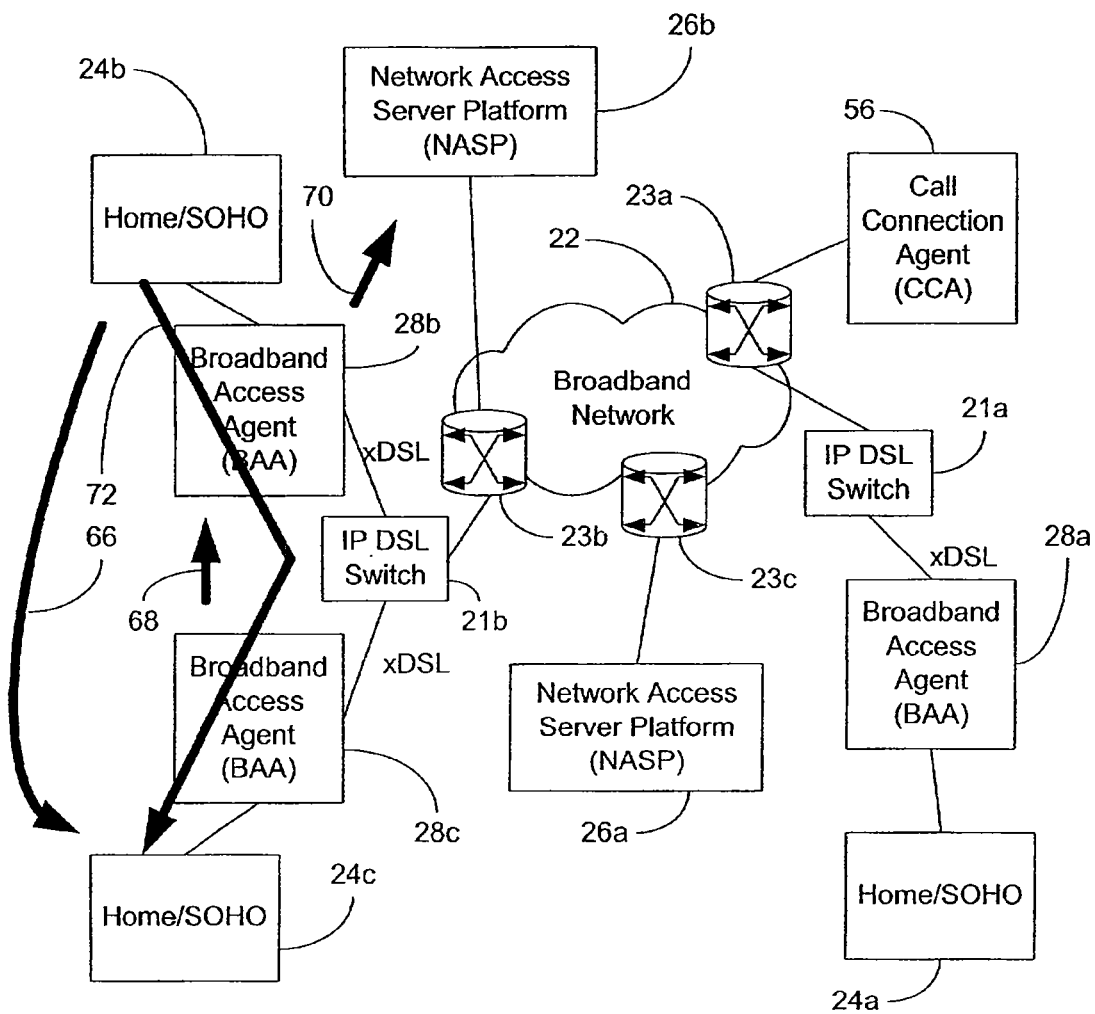
FIG. 3 is a diagram of an example of a networking architecture and call flow in accordance with a first alternative embodiment of the invention.

It will be appreciated that there may be instances in which the mobile terminal must be registered in another remote environment while the telecommunication service is being provided to the mobile terminal. It will be further be appreciated that the air interface protocols available to the respective environments may be the same or different. FIG. 3 illustrates the architecture 20' wherein the handoff between environment 24b and environment 24c is based on the same air interface protocol, such as IEEE 802.11 wireless local area network (WLAN). It can be seen that at arrow (or step) 66, a subscriber with a terminal supporting the IEEE 802.11 air interface protocol moves to environment 24c that supports the same air interface protocol, while the call is in progress. The terminal finds a better radio frequency (RF) signal from environment 24c (i.e., the neighboring service area), and registers with BAA 28c (the access agent). At step 68, BAA 28c forwards a mobile IP registration request to BAA 28b. Upon receiving the mobile IP registration request from BAA 28c, BAA 28b consults NASP 26b to determine whether the service is authorized at step 70. NASP 26b may contact NASP 26a in approving the service. BAA 28b replies to the request from BAA 28c, and subsequently intercepts and forwards the media packets destined to the terminal to BAA 28c at step 72. BAA 28c delivers the packets to the terminal in environment 24c. Thus, the terminal can continue the ongoing session without disruption.

Figure 4:
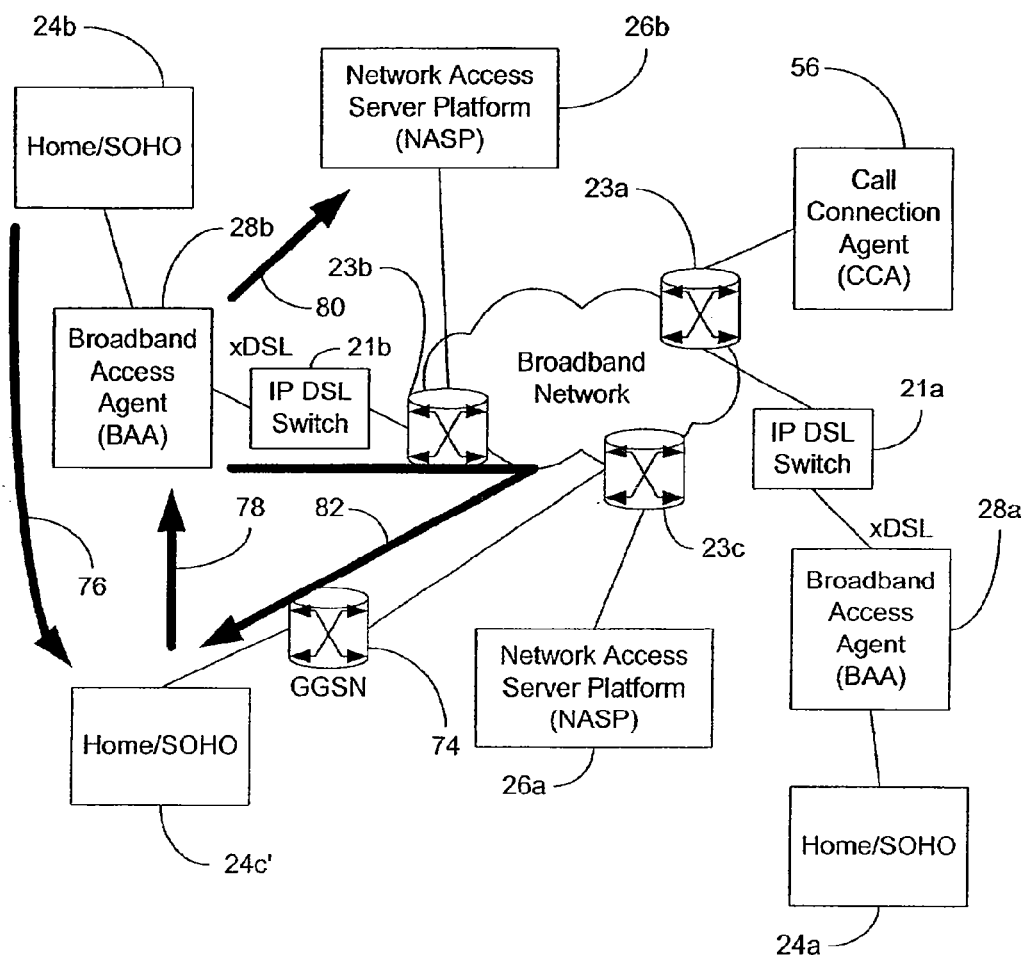
FIG. 4 is a diagram of an example of a networking architecture and call flow in accordance with a second alternative embodiment of the invention.

FIG. 4 shows an architecture 20" wherein the subscriber travels between service areas having different air interface protocols, such as IEEE 802.11 and 3G WCDMA, provided that the terminal is equipped with those radio devices. The major difference from the above scenario is that a gateway general packet radio services (GPRS) support node (GGSN) 74 replaces BAA 28c as the access agent. Specifically, at step 76 the subscriber moves from environment 24b, which supports IEEE 802.11 air interface to environment 24c', which supports 3G air interface, while the call is in progress. The terminal suffers a weakening 802.11 RF signal and activates its WCDMA air interface. The terminal finds WCDMA service, and registers with its network. The GGSN 74, as an access agent, forwards a mobile IP registration request to BAA 28b at step 78. Upon receiving the request from GGSN 74, BAA 28b consults NASP 26b to determine whether service is allowed at step 80 to determine whether this is allowed. As already discussed, NASP 26b may contact NASP 26a during the verification process. As illustrated at step 82, BAA 26b forwards the media packets destined for the mobile terminal to GGSN 74. GGSN 74 delivers the packets to the mobile terminal in environment 24c'. Thus, the mobile terminal can continue the ongoing session without disruption.

Figure 8:
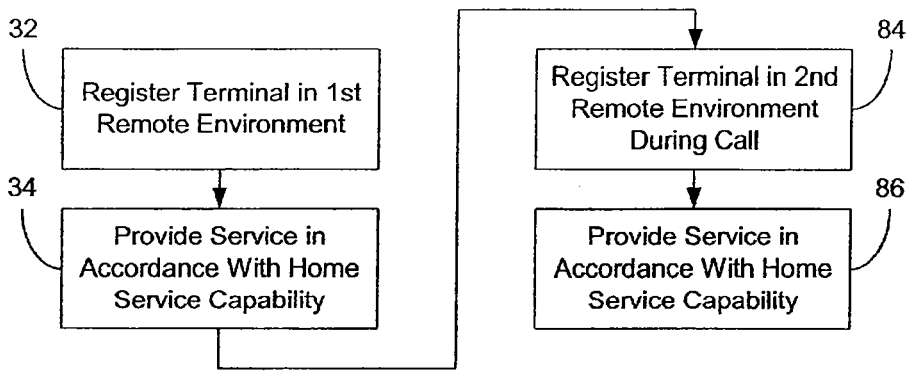
FIG. 8 is a flowchart of an example of an approach to supporting terminal handoff in accordance with one embodiment of the present invention.

FIG. 8 therefore illustrates the above-described handoff scenario at method 30'. It can be seen that in addition to registering and providing service in the first remote environment, processing block 84 provides for registering the terminal in a second remote environment during the call. The telecommunication service is provided to the mobile terminal in the second remote environment in accordance with the home service capability at block 86.

The systems and methods discussed above constitute a significant improvement with regard to providing enhanced end-to-end packet telephony and traditional telecommunication services with distributed end-to-end packet network environments. Since the transport methodology is irrelevant to the overall NASP and mobility management service concepts, the asynchronous transfer mode (ATM) with cell-based transport, frame relay network and IP based transport methodology from the environments are also applicable. The above methods and systems are applicable to current and future residential, SOHO, local and enterprise subscribers. They integrate residential and business services, and broadband networks to provide mobility for end-to-end packet/cell/frame-based services.

Those skilled in the art can now appreciate from the foregoing description that the broad teachings of the embodiments of the present invention can be implemented in a variety of forms. Therefore, while the embodiments have been described in connection with particular examples thereof, the true scope of the invention should not be so limited since other modifications will become apparent to the skilled practitioner upon a study of the drawings, specification, and following claims.

What is claimed is:

1. A method of providing a telecommunication service to a mobile terminal over a network, comprising:
    registering, via a processor associated with a first remote environment, the mobile terminal in the first remote environment having a default service capability, wherein the mobile terminal is associated with a home environment with a home service capability, wherein the first remote environment is different from and is remotely located from the home environment;
    receiving, via the processor, profile information associated with the mobile terminal, the profile information including the home service capability for enabling the first remote environment to provide the telecommunication service to the mobile terminal in the first remote environment in accordance with the home service capability; and
    providing, via the processor, the home service capability for the telecommunication service to the mobile terminal in the first remote environment, wherein the home service capability comprises a video service having a higher bandwidth as compared to a bandwidth of a default video service of the default service capability, wherein the telecommunication service is provided over a wireless interface.

2. The method of claim 1, wherein the network is a packet switched network.

3. The method of claim 1, further including registering the mobile terminal in a second remote environment while the telecommunication service is being provided to the mobile terminal.

4. The method of claim 3, further including:
    registering the mobile terminal in the first remote environment in accordance with an air interface protocol; and
    registering the mobile terminal in the second environment in accordance with the air interface protocol.

5. The method of claim 3, further including:
    registering the mobile terminal in the first remote environment in accordance with a first air interface protocol; and
    registering the mobile terminal in the second remote environment in accordance with a second air interface protocol.

6. The method of claim 1, further including providing a network centric service to the mobile terminal.

7. The method of claim 1, further including providing a provider specific service to the mobile terminal.

8. The method of claim 1, further including providing a video conferencing service to the mobile terminal.

9. The method of claim 1, further including providing a multimedia service to the mobile terminal.

10. The method of claim 1, further including upgrading from the default service capability to the home service capability.

11. A method of registering a mobile terminal in a remote environment, comprising:
    receiving, via a processor associated with a home environment, a registration message from an access agent of the remote environment, wherein the mobile terminal is associated with the home environment with a home service capability, wherein the remote environment is different from and is remotely located from the home environment;
    verifying, via the processor, that the registration message was initiated by the mobile terminal; and
    sending, via the processor, profile information associated with the mobile terminal to the access agent, the profile information including the home service capability for enabling the access agent to provide a telecommunication service to the mobile terminal in the remote environment in accordance with the home service capability, wherein the home service capability comprises a video service having a higher bandwidth as compared to a bandwidth of a default video service of the default service capability, wherein the telecommunication service is provided to the mobile terminal by the access agent over a wireless interface in the remote environment.

12. The method of claim 11, further including updating location information associated with the mobile terminal based on the registration message.

13. The method of claim 12, further including storing an internet protocol address associated with the remote environment in a memory.

14. The method of claim 11, further including:
    storing the profile information in a memory; and
    retrieving the profile information in response to the registration message.

15. The method of claim 14, further including storing the profile information in accordance with a web-based service management dialogue with a user.

16. The method of claim 14, further including storing the profile information in accordance with an interactive voice session with a user.

17. A method of providing a broadband telecommunication service to a mobile terminal, comprising:
    receiving, via a processor associated with a home environment, a registration message from an access agent of a remote environment, wherein the mobile terminal is associated with the home environment with a home service capability, wherein the remote environment is different from and is remotely located from the home environment;
    verifying, via the processor, that the registration message was initiated by the mobile terminal;
    updating, via the processor, location information associated with the mobile terminal based on the registration message; and
    sending, via the processor, profile information associated with the mobile terminal to the access agent, the profile information including the home service capability for enabling the access agent to provide the broadband telecommunication service to the mobile terminal in the remote environment in accordance with the home service capability, wherein the home service capability comprises a video service having a higher bandwidth as compared to a bandwidth of a default video service of the default service capability, wherein the broadband telecommunication service is provided to the mobile terminal by the access agent over a wireless interface in the remote environment.

18. The method of claim 17, further including enabling the access agent to provide a video conferencing service to the mobile terminal.

19. The method of claim 17, further including enabling the access agent to provide a multimedia service to the mobile terminal.

* * * * *